Patented Jan. 19, 1937

2,068,465

UNITED STATES PATENT OFFICE 2,068,465

PROCESS FOR PURIFICATION OF MUSTY WATER

Esteban Diaz Ortega, Habana, Cuba

No Drawing. Application August 31, 1934,
Serial No. 742,356

4 Claims. (Cl. 210—2)

This invention has reference to the purification of musty water from alcohol stills or other industrial plants and to the recovery therefrom of potash which may have commercial value. The process herein described purifies the musty water and fits it for further industrial uses and at the same time precipitates from it potash and other ingredients which may be further treated and used for instance as industrial fertilizer.

The process consists in treating the musty water from stills under certain conditions of temperature with a given quantity of calcium oxide or quick lime, and natural water in the form of a spray so as to precipitate therefrom the impurities as a sediment which may be further treated for commercial use.

By means of this process, the rapid purification of the water is accomplished, causing it to be odorless, making the residues fit for their industrial use as a fertilizer and the water already purified is thereby made ready for further treatment and the extraction therefrom of an appreciable quantity of potash.

This process is especially applicable to stills used in the manufacture of alcohol, and to slaughter houses, and not only is the purification of the water accomplished, but it also becomes odorless, and in the case of slaughter houses, the residues are disinfected and thus fit for industrial use.

This process in detail is as follows:

For stills used in the manufacture of alcohol; the musty water is poured into containers or tanks the interiors of which have been fitted with steam cocks for the purpose of supplying the necessary heat to the water, according to the daily production. There shall be 4 of these receptacles of sufficient capacity to hold a quantity of water equal and in addition to the quantity of musty water to be purified so as to dilute and reduce the density of the musty water. Upon effecting the above mentioned operation, the water should be heated at a boiling point temperature of 100 degrees, being careful that this ebullition be continued for approximately three minutes. Just before this ebullition, a mixture of 48 grams of what is industrially known in Cuba as quick lime to each gallon of the original musty water to be purified is added. After this operation has been completed, the water so mixed is poured into another container of sufficient size and capacity to hold the water already mixed from the four containers and of a size and shape large enough to permit the water to cool as rapidly as possible, preferably of the type used by the sugar mills. As soon as the water is in the latter container where the precipitation of the sediment is to take place, it is sprayed with natural cold water in the ratio of 1:1 if the water being treated is of natural origin. If the musty water is of industrial origin a larger proportion of cold water for spraying must be used. In this case the ratio of spraying water to musty water is 1½ to 1. In this step the cold water must be rapidly and evenly sprayed on the surface of the hot musty water to cool it rapidly and bring about the rapid precipitation of the solids therein. After this operation is completed, within 3 to 4 minutes, all the solids contained in the water will spontaneously go to the bottom of the receptacle. Care must be exercised to see that as soon as the solids contained in the water have settled, this being very rapid, the water should be emptied into other receptacles, to be used again as I shall explain later. Immediately thereafter, the solids which are ready and disinfected may be gathered and used as a valuable fertilizer. By using this process, 104 grams of solids are obtained from each gallon of musty water.

After the solids have been precipitated from the treated musty water as indicated above and separated therefrom, the purified water may be further treated to extract the potash. This is done by subjecting the purified water to an evaporating treatment with petroleum using 1 gallon of petroleum to 30 gallons of the water and using the vacuum process of evaporation in use in sugar mills. By this process it is possible to recover from 15 gallons of original musty water from 1500 to 1800 grams of potash.

In the slaughter houses, this mixture should be used in the same proportion as the foregoing mixture. The use of this mixture purifies the water and the sediments or residues are completely disinfected and the bones are cleaned and may be used in industry.

What I claim is:

1. A process for purifying the musty water from alcohol stills which consists in diluting the musty water with fresh water in the ratio of 1:1, heating the diluted water to the boiling point, adding quick lime in the ratio of 48 grams to 1 gallon of the original musty water just before ebullition, transferring the liquid to a cooling container having a large exposed surface, and spraying the liquid with cold water in the ratio of 1 part of cold water to 1 part of the hot liquid, whereby the solids are precipitated.

2. A process for purifying the musty water from alcohol stills which consists in diluting the musty water with an equal quantity of fresh water at normal temperature, heating the mixture to near the boiling point, adding quick lime in the ratio of 48 grams to 1 gallon of the original musty water, raising to the boiling point, spraying with cold water in the ratio of 1 gallon of cold water to 1 gallon of the liquid to be cooled, let stand from 3 to 4 minutes while the solids are precipitated and drawing off the water from the sediment.

3. A process for purifying the musty water from stills which consists in diluting the musty water with an equal quantity of fresh water at normal temperature heating the liquid to near the boiling point, adding quick lime in the ratio of 48 grams to 1 gallon of the original musty water, raising the temperature to the boiling point and maintaining the boiling temperature for 3 minutes, transferring the hot liquid to a shallow cooling container, rapidly spraying the hot liquid with cold water in the ratio of 1 gallon of cold water to 1 gallon of the liquid thereby cooling the liquid and precipitating the solids.

4. A process for the recovery of potash from the musty water from alcohol stills which consists in proceeding in the manner defined in claim 2 and then adding petroleum to the purified water in the ratio of 1 gallon of petroleum to 15 gallons of the original musty water and evaporating by the vacuum process.

E. DIAZ ORTEGA.